UNITED STATES PATENT OFFICE.

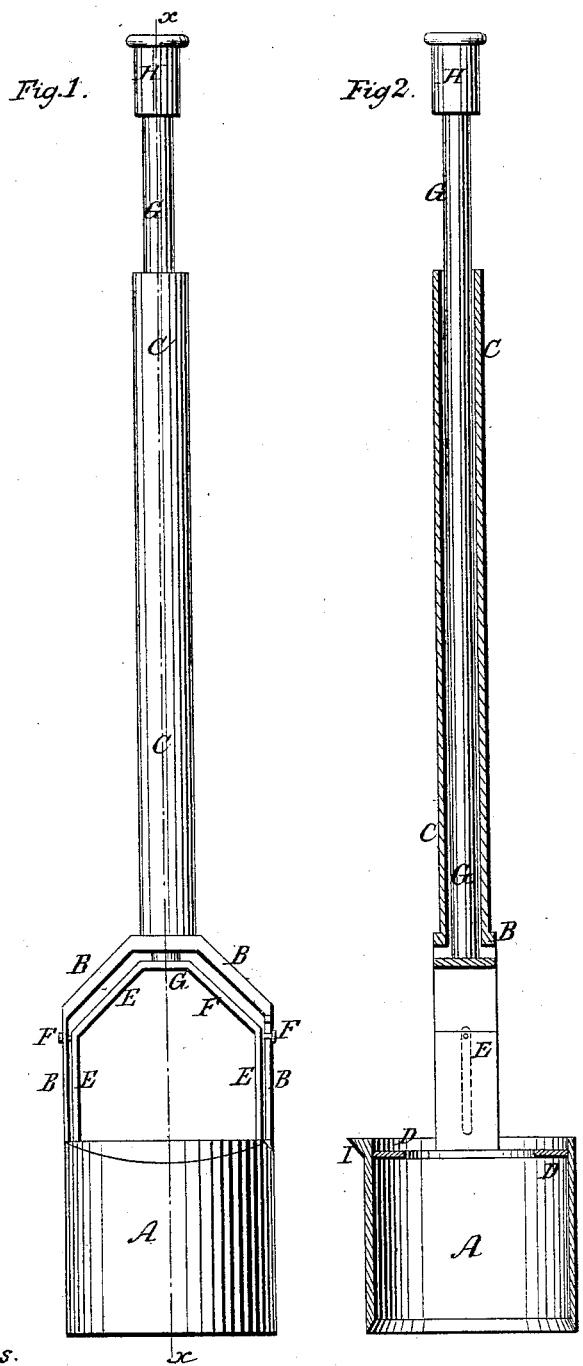

W. C. S. ELLERBE, OF CAMDEN, SOUTH CAROLINA.

IMPROVEMENT IN INSTRUMENTS FOR TRANSPLANTING PLANTS.

Specification forming part of Letters Patent No. 58,794, dated October 16, 1866.

*To all whom it may concern:*

Be it known that I, W. C. S. ELLERBE, of Camden, in the county of Kershaw and State of South Carolina, have invented a new and useful Improvement in Plant-Transplanters; and I do hereby declare that the following is a full, clear, and exact description thereof, which will enable others skilled in the art to make and use the same, reference being had to the accompanying drawings, forming a part of this specification, in which—

Figure 1 is a side view of my improved transplanter. Fig. 2 is a vertical longitudinal section of the same, taken through the line $x$ $x$, Fig. 1.

Similar letters of reference indicate like parts.

My invention has for its object to furnish an instrument by means of which all kinds of plants, such as corn, cotton, &c., can be transplanted without injury to the plant or checking its growth, the position of the fibrous roots in the soil not being disturbed; and it consists of a plant-transplanter formed of a cup and handle, and a rod and pusher, constructed as hereinafter more fully described.

A is the cup, which should be made of cast-iron; but its lower or cutting edge should be steel. To the upper edge of the cup A, on opposite sides, are rigidly attached arms B. These arms extend upward vertical with the sides of the cup till they about equal in length the height of said cup. They are then bent inward, and are securely attached to the lower end of the handle C. The vertical portions of the arms B are slotted, as shown in Figs. 1 and 2. The handle C is made hollow, as shown in Fig. 2.

D is the pusher, which is in the form of a flat ring, as shown in Fig. 2, fitting into the interior of the cup A, as shown. To the outer edges of this ring or pusher is firmly connected arms E, of the same shape as the arms B, and of such a length that when the pusher D is drawn up to the top of the cup A the arms D may fit within the arms B, as shown in Fig. 1. Upon the upper ends of the vertical parts of the arms D are formed projections F, passing into and working in the slots formed in the arms B, as before described. The arms D at their upper ends are attached to the lower end of the rod G, which passes up through the hollow handle C, as shown in Fig. 2, and terminates in a knob or handle, H, by means of which the pusher may be operated.

The lower edge of the cup A should be beveled on the inside, both for the purpose of forming an edge that may easily penetrate the ground, and also for the purpose of packing the earth as it enters or is forced up into the cup A, so that it may remain in the cup when said cup is withdrawn from the ground. The upper edge of the cup A should be furnished with a flange or thicker part, I, as shown in Fig. 2, for the foot to rest upon in pushing the said cup into the ground.

In using the instrument, the cup A is forced into the ground at the point to which it is desired to transplant the plant by pressing upon its upper edge, I, with the foot. This forces the pusher D to the upper part of the cup. The instrument is then lifted from the ground full of earth, from which it is cleared by forcing down the pusher D by means of the rod G. It is then placed over the plant, which is removed from the ground with its surrounding earth, in the manner before described. The instrument, with the plant and earth, is then placed in the hole before prepared, and the cup withdrawn, the plant and surrounding earth being held down while withdrawing the cup by pressing the pusher down by means of the rod G.

I claim as new and desire to secure by Letters Patent—

An improved plant-transplanter, formed of a cup, A, and handle C, and of a pusher, D, and rod G, constructed and combined with each other, substantially as herein described, and for the purposes set forth.

W. C. S. ELLERBE.

Witnesses:
   J. K. WITHERSPOON,
   H. K. WITHERSPOON.